United States Patent

[11] 3,603,929

| | | |
|---|---|---|
| [72] | Inventor | Thomas T. Drysdale<br>4116 Witacre Road, Fairfax, Va. 22030 |
| [21] | Appl. No. | 858,774 |
| [22] | Filed | Sept. 17, 1969 |
| [45] | Patented | Sept. 7, 1971 |

[54] DISTANCE MEASURING DEVICE
8 Claims, 8 Drawing Figs.

[52] U.S. Cl. ....................... 340/104,
73/489, 340/97, 340/103, 356/29
[51] Int. Cl. ........................ B60r 1/00,
G01c 3/00
[50] Field of Search .......................... 340/104,
103, 97, 98, 87; 356/29; 73/489, 490

[56] References Cited
UNITED STATES PATENTS
3,469,234  9/1969  Greacen .................... 340/103
3,521,234  7/1970  Davin ....................... 340/97

Primary Examiner—John W. Caldwell
Assistant Examiner—Howard Cohen
Attorney— Watson, Cole, Grindle & Watson ABSTRACT: The gauging means is installed in a recess in the top of the dash of an automobile and consists of horizontally relatively movable strips geared to a speedometer means to assume positions the spacing of which bears a relationship to the speed of the car. A phantom image of the two gauge strips is projected upon and reflected from the glass windshield in a position approximately at eye-level and in the line of vision toward a car ahead. The eyes of the observer-driver are naturally focused on the car ahead and thus a double image of the gauge strips is seen and due to the overlap of vision, a centrally disposed composite phantom strip of a length variable according to the speed of the car appears in substantial registry with the view of the car ahead. By proper calibration of the gauge, it will be seen that when the apparent lateral dimension of the car ahead exceeds or falls short of the length of the phantom overlapping image of the gauge strips, the operator can determine whether he should reduce his speed and fall back or whether he can safely increase his speed The calibration is such that when the length of the gauge image is approximately equal to the observed width of the car ahead, the spacing of the two vehicles is proper for the indicated speed.

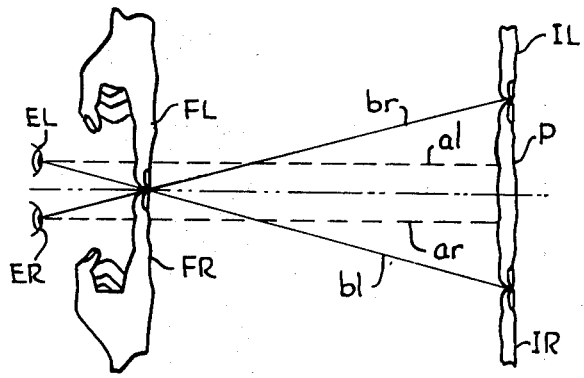
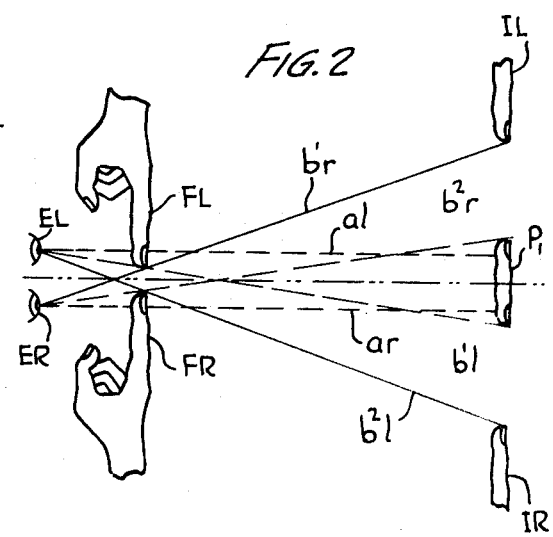
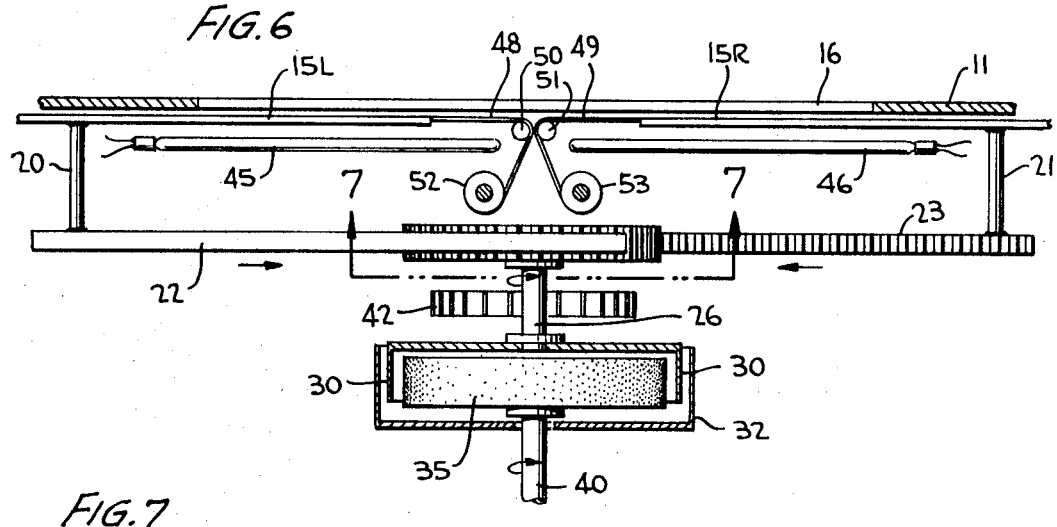
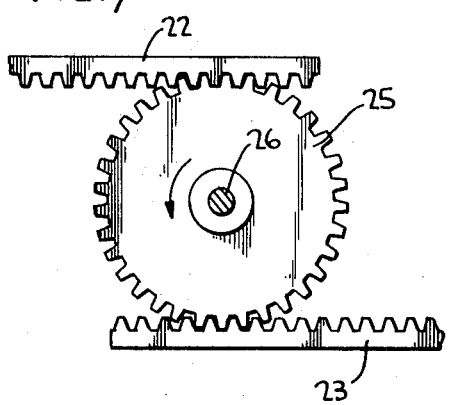
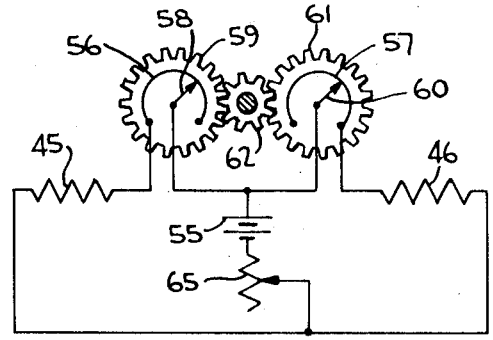
INVENTOR,
THOMAS T. DRYSDALE

INVENTOR,
THOMAS T. DRYSDALE

BY Watson, Cole, Grindle & Watson
ATTORNEYS

DISTANCE MEASURING DEVICE

This invention relates to distance gauging devices and more particularly to devices of this character which are applicable to the ascertaining and maintaining of the proper safe distance from the car ahead of the vehicle which the observer is driving, in order to prevent the prevalent vice of "tailgating," or driving too closely to the car ahead.

The principal object of the invention is to provide gauging means whose apparent length is variable according to the speed of the vehicle carrying it, and which is so disposed as to be lined up with the observer's view of the end of the car ahead (or to project a modified image of itself to be so aligned), so that a comparison of the width of the car (as viewed by the observer) with the then length of said gauge will inform the observer-driver as to whether he is following at the proper safe distance.

In its preferred embodiments, the invention contemplates the provision of a horizontal gauging element extending transversely of the observer's vehicle and within the forward field of vision of the observer and at such an elevation as to substantially coincide vertically with the view of the car ahead. The apparent transverse length of the gauging element is variable by certain novel transmission means geared to the wheels of the vehicle or to the speedometer or a modification thereof.

Preferably, for practical reasons involving convenient location of the transmission means and for preventing actual obstruction of the observer's vision by the gauging element itself, the element is mounted on the top of the instrument panel or dash and the reflected focally distorted image of the element observed as a phantom gauge reflected in the windshield itself at the approximated location of the visual image of the car ahead.

The invention takes advantage of the peculiarity of double vision resulting from the focusing of the observer-driver's eyes upon the car ahead, while secondarily viewing the gauging means out of focus. The effective apparent length of the gauge is calibrated so that for any given speed of the observer's car, the measure is such as to indicate the apparent width that the car ahead should exhibit at the proper spacing for safety. A common formula is one car-length for every 10 miles of speed.

Other objects and features of novelty will be apparent from the following specification when read in connection with the accompanying drawings in which one embodiment of the invention is illustrated by way of example.

IN THE DRAWINGS

FIGS. 1 and 2 are diagrams by which is developed the explanation of the nature of the out-of-focus phantom gauge device;

FIG. 6 is a view partly in elevation and partly in section of a suggested arrangement of the mechanical gauge and a transmission means for varying the apparent length of the phantom gauge in accordance with a speedometer mechanism operatively connected with the vehicle wheels;

FIG. 7 is a fragmentary bottom plan view taken on line 7—7 of FIG. 6; and

FIG. 8 is a diagram showing one way of controlling the illumination of the physical gauge element in accordance with the amount of daylight and for any variation in vision between the right and left eyes of the observer.

As a means of demonstrating one of the basic principles of the invention, an experiment as suggested in FIGS. 1 and 2 of the drawings is proposed. If one places the tips of his index fingers FR and FL together end-to-end in front of his eyes ER and EL and focuses his eyes on the wall or ceiling of the room, he will see not only the images IR and IL of his fingers but also a phantom image P, which is a sort of composite of the two fingers appearing to have tips or nails at both ends.

Now if the fingers are moved apart a short distance as indicated in FIG. 2, the images IR and IL will move apart a corresponding distance and the phantom image $P_1$ will appear to shrink in length and float between the two right and left finger tips images. The length of the phantom image $P_1$ varies with the distance of the actual fingers from the eyes, being longer the nearer they are to the eyes; and the composite phantom image $P_1$ will similarly vary in length according to the distance of the fingers from the eyes, but will also shrink in proportion to the distance that the fingers FL and FR are separated.

Recalling that the eyes are focused on a distant point on the wall, it will be realized that the lines of sight from the eyes toward that point would converge somewhat. However, since this is a relatively great distance as compared to the distance of the finger tips from the eyes, the lines of sight toward the focusing point on the wall can be approximately represented by the parallel lines $al$ and $ar$. Thus at the plane of the fingers, the vision is out-of-focus and the junction of the finger tips appears to be double as indicated in FIG. 1 and this is indicated by angular lines of sight $br$ and $bl$. Upon separation, as indicated in FIG. 2, the angular lines of sight past the tip FL from the left eye EL are $b^1l$ and the line from the eye ER is shown at $b^1r$. Similarly the line of sight from the eye EL past the finger tip FR is shown at $b^2l$ and from the eye ER the line is designated $b^2r$.

In applying these developments to the present invention, in gauging the proper distance of the driver's car from the car ahead, use is made of a phantom image corresponding to the image $P_1$ of FIG. 2; and for this purpose an apparatus suggested in the remaining figures of drawings is proposed as an exemplary embodiment of the invention.

Figure 3:
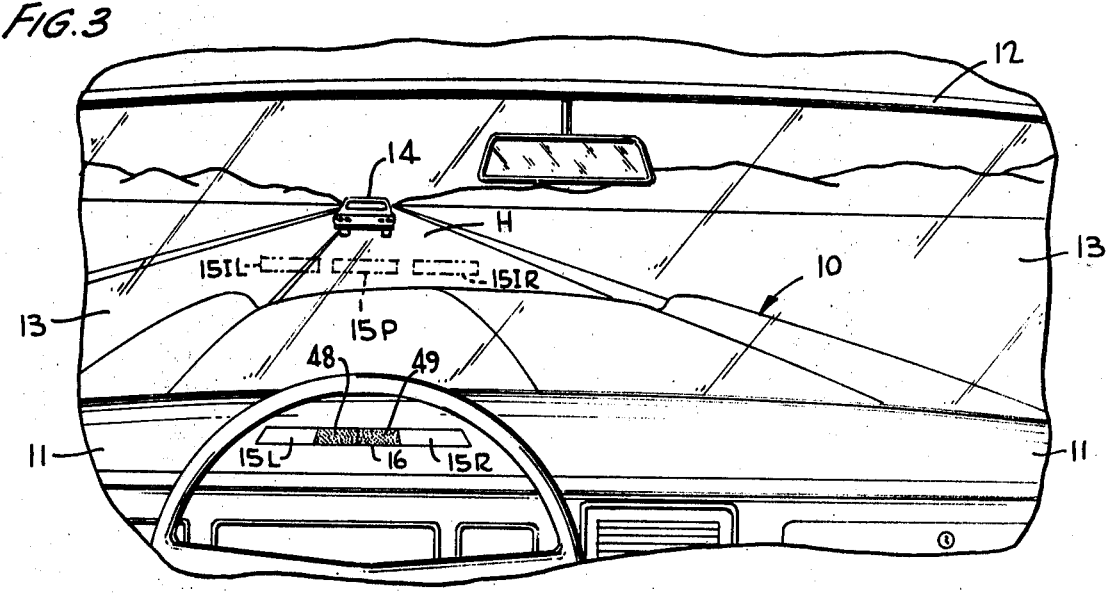
FIG. 3 is a somewhat diagrammatic view in perspective through the windshield of the following car showing the correct appearance of car ahead in relation to the gauging image at an intermediate speed.
Figure 4:
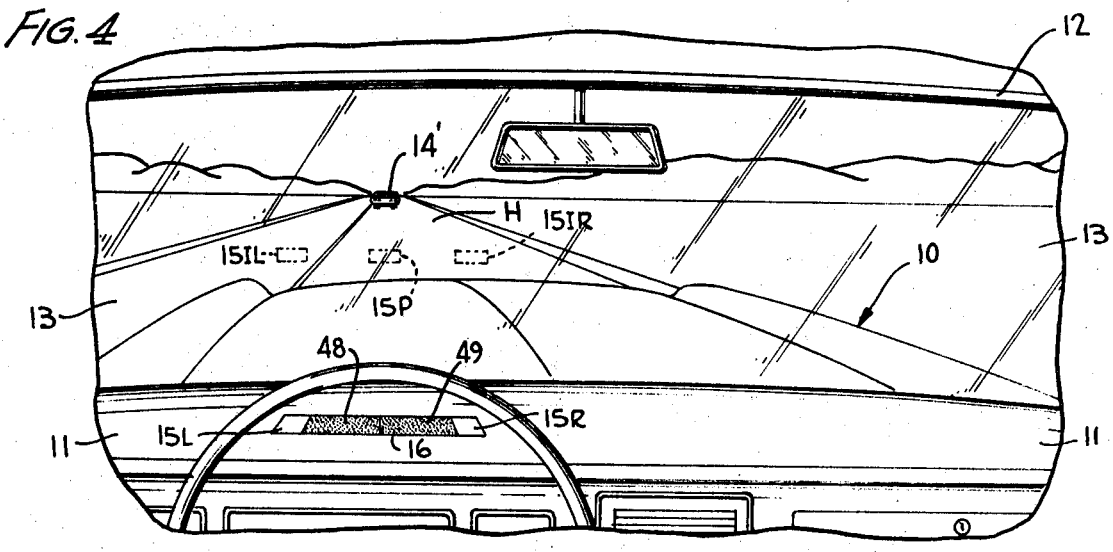
FIG. 4 is a similar view showing the gauge shortened by an increased speed of the vehicle but still at a proper distance as indicated by the approximately equal dimensions of the gauge and the width of the car ahead.
Figure 5:
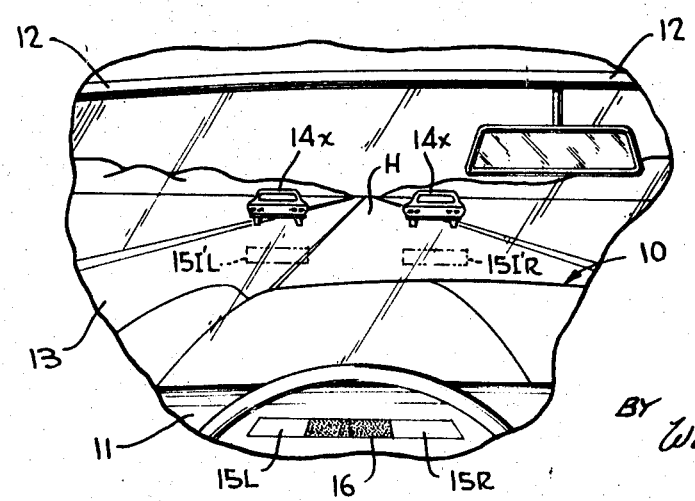
FIG. 5 is a similar view but indicating the erroneous effect of focusing the eyes on the gauge image rather than on the car ahead.

In FIGS. 3, 4, and 5 the driver-observer is assumed to be in the automobile designated 10 and of course looking through the glass windshield 13 which is disposed between the roof-structure 12 and the dash or instrument panel 11. The car 10 is presumed to be proceeding down the highway H and in FIG. 3 it is trailing a leading vehicle designated 14 at a relatively close distance. In FIG. 4 the leading car is designated 14', and is shown for example as being further ahead on the highway.

To develop a phantom gauge-element corresponding to the composite phantom image $P_1$ of FIG. 2 of the drawings, there are provided within an opening 16, in the top of the dash or instrument board 11, a pair of slidable gauge strips 15L and 15R. The strips 15L and 15R are mounted for elative lateral movement by means of mechanism which will be presently described and this movement corresponds to the movement of the finger tips as described in FIGS. 1 and 2. For the purposes of the present invention, the separation of the strips 15L and 15R is effected in a ratio governed primarily by the speed of the motor vehicle 10.

As shown in FIGS. 3, 4, and 5, the gauge strips 15L and 15R are reflected in the windshield by phantom images indicated respectively at 15IL and 15IR, and the central composite image 15P. However in FIG. 5 of the drawings which represents a false aspect of the in invention, the eyes are focused on the plane of the windshield instead of on the car ahead, and the phantom images which appear reflected on the windshield are represented only by the strips 15IR and 15IL. To bear this out, the preceding motor vehicle 14X is out of focus and appears double. However this is not the way the ordinary vision of the driver of a moving vehicle works.

In FIG. 3 of the drawings where the driver's vision is focused on the car 14, the phantom image 15P will appear just as in the case of the image $P_1$ in FIG. 2 of the drawings and by means which will presently be described, the spacing of the strips 15L and 15R by speedometer related transmission means is such that the phantom image 15P assumes different lengths related to the speed of the vehicle 10 and the desired ratio of following distance prescribed to prevent tailgating. For example, it is commonly supposed that the proper trailing distance for safety is one car-length for each 10 miles per hour of speed. It is assumed therefore that the car 10 is moving at the proper speed with relation to the distance from the car 14 ahead and the width of that car as it appears to the eye of the driver approximately coincides with the width of the reflected phantom image 15P as shown.

Accordingly in FIG. 4 of the drawings the car 14' is much further ahead and the fact that the phantom image 15P in this case is much shorter but is till of the dimension of the width of the car 14', would indicate that the car 10 can and is proceeding at a higher rate of speed. This is also indicated by the considerably further spacing of the gauge strips 15L and 15R.

Thus it will be seen that by proper calibration of the movement of the strips 15L and 15R, taking into consideration the speed of the automobile in which they are installed, the proper trailing distance presumed to be safe, and the average width of most motor vehicles on the highway, the matching of the length of the phantom gauge image 15P with the width of the car ahead in the line of sight of the operator, will indicate that the car 10 is proceeding at a safe following distance. Of course, "Wide-load" vehicles and extremely narrow sports cars or motor cycles cannot be included within the purview of the invention, unless auxiliary gauge strip correcting or modifying means are provided, but these are exceptional situations rather than ordinary.

Now, with particular reference to FIGS. 6, 7 and 8 of the drawings one suggested means of installing and using gauge strips 15L and 15R will be described. These gauge strips are preferably made of light colored transparent plastic material and are slidably mounted by any suitable means beneath the thickness of the dash or instrument board 11 of the car and registering with the opening 16 therein.

The strips 15L and 15R are rigidly secured as by means of the posts 20 and 21 to the respective racks 22 and 23, these racks being suitably mounted for sliding movement in operative engagement with the teeth of the gear 25, at opposite sides of said gear.

The gear is rigidly carried by the shaft 26 and at the lower end of the shaFt is carried a cuplike structure including the aluminum ring 30.

Disposed within the sheath 32 is the rotating magnet 35 fixed upon the end of the shaft 40 which is driven from the wheels of the car, all in the same general assembly and operation as in the case of the conventional speedometer. A coil centering spring 42 at its inner end is fixed to shaft 26 and its outer end is attached to a fixed point in the supporting structure.

It will be understood by analogy to the principles of speedometer design that the rotating magnet 35 will exert a drag on the ring 30 against the restraint of the spring 42 and this will cause the gear 25 to rotate a distance governed by the speed of the vehicle 10 and in accordance with the calibrations related to the desired trailing distance and the average width of motor vehicle on the highway. The rotation of the gear 25 will of course serve to separate the gauged strips 15L and 15R through the racks 22 and 23 and it will seem that the greater the speed of the vehicle 10 the wider will be the separation of the strips; and as demonstrated earlier, the wider the separation of the strips the smaller will be the length of the phantom gauge image 15P, thus the more distant will be the car ahead for safety at the given higher speed.

For proper visibility of the strips 15L and 15R and their phantom images, they are back-lighted by the illuminating bulbs 45 and 46, and in order to concentrate the light through translucent gauge strips, the recess or opening 16 between the strips is preferably shrouded by the black tapes or ribbons 48 and 49 which are connected to the respective inner ends of the gauge strips, trained around the rollers 50 and 51, and wound upon the spring-retracted spools 52 and 53.

The illumination by means of lamps 45 and 46 should obviously be varied according to day or night driving and according to the amount of daylight prevailing. Also, since a driver's eyes may be of unequal vision, the illumination from the respective lamps 45 and 46 may be varied between themselves. A suggested means for accomplishing this control is shown in FIG. 8 of the drawings. The lamps 45 and 46 are diagrammatically shown within the electric circuit powered by the battery 55. A rheostat 56 controls the current to the lamp 45 and a similar rheostat 57 controls the flow of current to the lamp 46. The armature 58 of the rheostat 56 is fixed to move with the gear 59 and the armature 60 of the rheostat 57 is similarly secured to the gear 61. A manually operated pinion 62 is in mesh with both gears and when rotated will serve to increase the current to one of the lamps while decreasing it with respect to the other.

For simultaneously controlling the overall current to the lamps for variation in day or night illumination of the highway, a variable resistance 65 is provided.

I claim:

1. Apparatus for installation in a vehicle for indicating to the operator the attainment of the proper safe distance from a vehicle ahead for any given speed, said apparatus comprising a gauging device mounted in the first named vehicle, means for changing a transverse dimension of said device in relation to the speed off the vehicle, said device calibrated to correspond at a given speed to an apparent transverse dimension of the vehicle ahead when the spacing of the two vehicles is proper for safety at that speed, and means for disposing said device so that its transverse dimension may be readily compared with the apparent corresponding transverse dimension of the vehicle ahead as observed by said driver.

2. The apparatus as set forth in claim 1, in which, when the eyes of the operator are focused on the vehicle ahead, an out-of-focus double image of the gauging device is seen, and a portion of said double image, variable in transverse dimension according to the speed of the first named vehicle, is employed for such comparison.

3. The apparatus as set forth in claim 1 in which said device comprises a pair of aligned strips in approximate abutting end-to-end relationship when the vehicle is stationary but movable apart distances related to the speed of the vehicle, whereby when the driver's eyes are focused on the vehicle ahead a composite phantom image appears in the line of sight for comparison with the dimension of the vehicle ahead, due to the out-of-focus view of the gauge device.

4. An apparatus as set forth in claim 2 in which said device comprises a pair of aligned strips in substantial abutting end-to-end relationship when the vehicle is stationary but movable apart distances related to the speed of the vehicle, whereby when the driver's eyes are focused on the vehicle ahead, a composite phantom image appears in the windshield for comparison with the dimension of the vehicle ahead, due to the out-of-focus view of the reflection of the gauge device.

5. The device as set forth in claim 1 in which said device comprises a pair of aligned strips in substantial abutting end-to-end relationship when the vehicle is stationary but movable apart distances related to the speed of the vehicle, and there are provided means for slidingly mounting said strips in the vehicle, spring restrained means operatively connected with the strips and means for urging said spring restrained means against such restraint in a ratio to the speed of the vehicle.

6. The device as set forth in claim 5 in which said device is mounted on top of the instrument panel of the first named vehicle and its image reflected from the windshield in the approximate line of sight of the driver toward the vehicle ahead, and there are provided means affording back illumination of said strips and means for controlling the intensity of illumination according to the natural light available at a given time of the day, and for variably illuminating the respective strips according to any variation in the visual condition of the right and left eyes of the driver 7. The apparatus as set froth in claim 4 in which there are provided means affording back illumination of said strips and means for controlling the intensity of illumination according to the natural light available at a given time of the day, and for variably illuminating the respective strips according to any variation in the visual condition of the right and left eyes of the driver.

8. The device as set froth in claim 5 in which said device is mounted on top of the instrument panel of the first named vehicle and its image reflected from the windshield in the approximate line of sight of the driver toward the vehicle ahead, and there are provided means for back illumination of said strips, said strips being of translucent material, opaque strips of flexible material connected with the mutually facing ends of said gauge strips and brought into virtual contact at the mid portion of the device, and having their ends wound around spring restrained spools, whereby light from the illuminating means is projected only through said gauge strips.